United States Patent Office 3,019,668
Patented Feb. 6, 1962

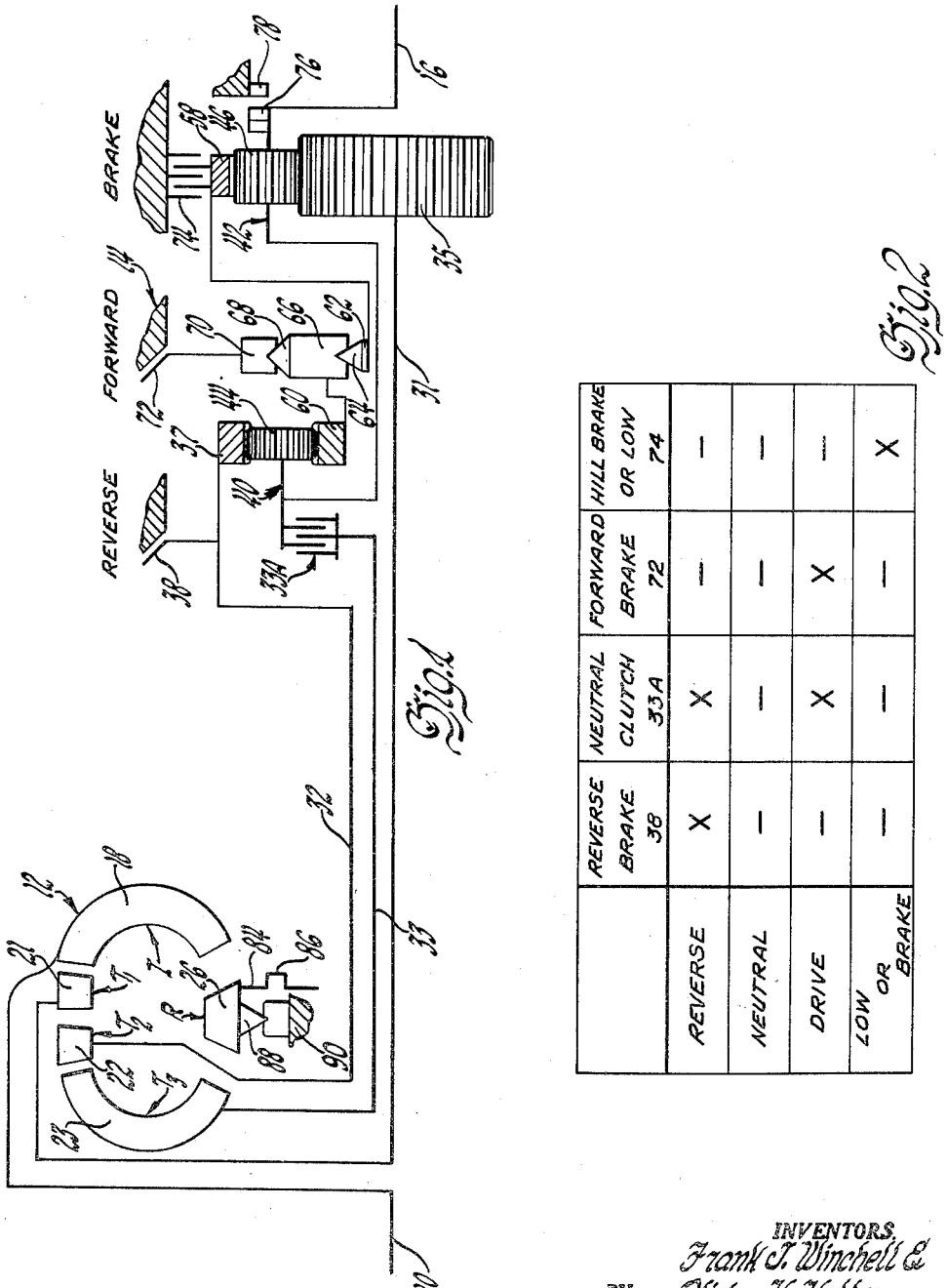

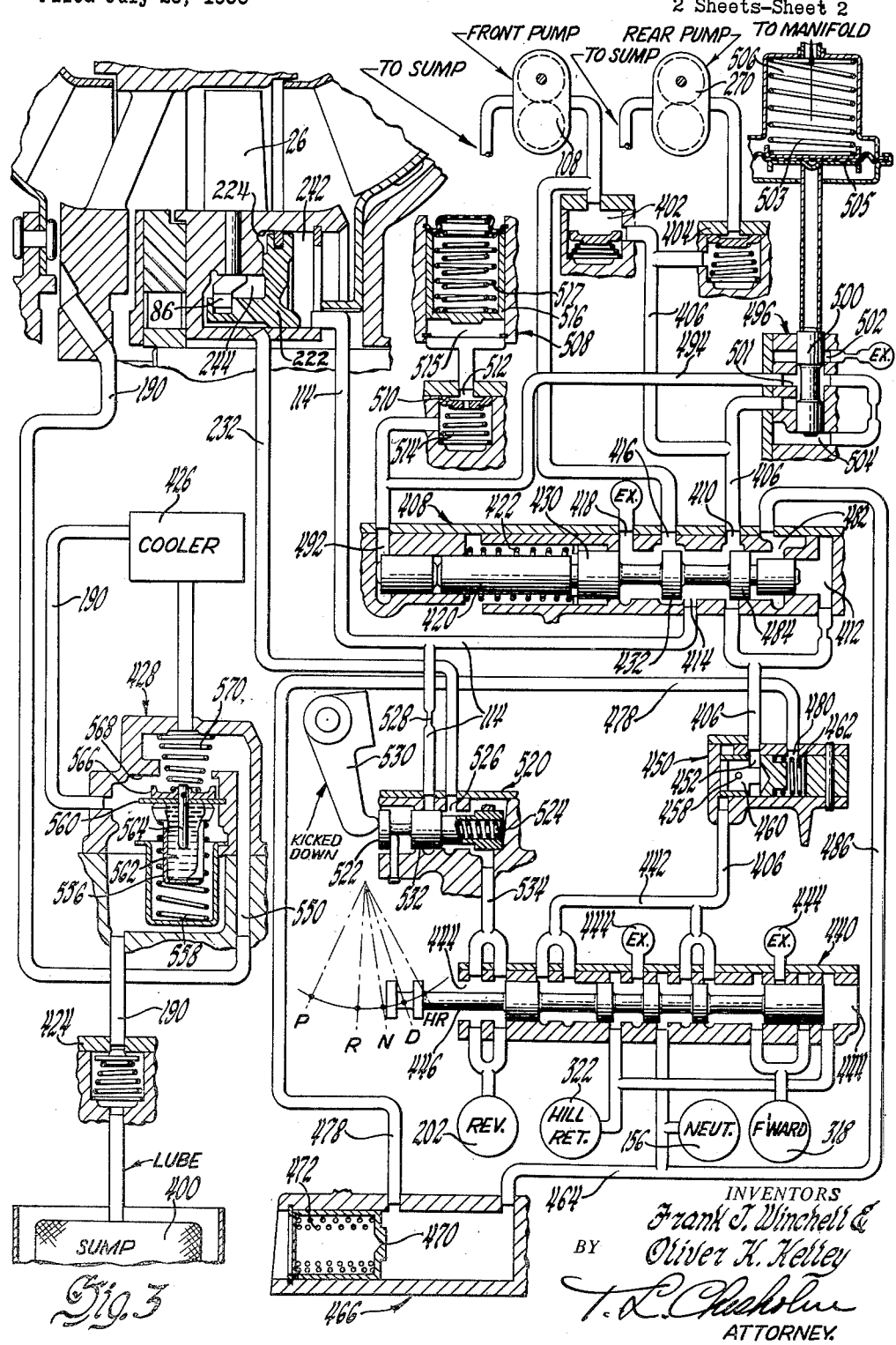

3,019,668
TRANSMISSION
Frank J. Winchell, Franklin Village, and Oliver K. Kelley, Bloomfield Hills, Mich., assignors to General Motors Corporation, Detroit, Mich., a corporation of Delaware
Filed July 25, 1956, Ser. No. 600,022
7 Claims. (Cl. 74—645)

This invention relates to improvements in the construction, arrangement, and control system in transmissions embodying hydrodynamic torque transmitting devices which drive gearing for driving a power output shaft at various speed ratios. The torque transmitting device may be a torque converter and the transmission may be used for driving a motor vehicle.

One of the objects of the invention is to provide an improved system for controlling the torque multiplication of the converter.

More specifically it is an object to provide a control system in which the torque multiplication in the torque converter can be increased only under specific drive conditions, for example forward, but cannot be increased in other drive conditions such as reverse.

Still more specifically it is an object to effect this result by connecting a pressure control or vent line for the torque multiplication control apparatus to one of the pressure chambers which provides a particular torque transmitting relationship (for example reverse) so that when the corresponding torque-transmitting relationship is established the control apparatus cannot be vented, and so torque multiplication cannot be increased.

The foregoing and other objects and advantages of the invention will be apparent from the annexed description and from the accompanying drawings, in which:

FIG. 1 is a schematic representation of one form of transmission embodying the invention, this being half of a symmetrical section along the axis;

FIG. 2 is a chart of the control conditions showing how the various drive conditions are established; and FIG. 3 is a schematic control diagram of one form for the transmission shown in FIG. 1.

Referring to FIG. 1, the transmission includes an input shaft 10 driving a hydrodynamic torque converter 12 which drives planetary forward and reverse reduction gearing 14 connected to a final output or drive shaft 16. The torque converter itself may be constructed and arranged as described below and includes a pump or impeller I of generally known form represented diagrammatically in FIG. 1 by a single blade 18 rotated by the input shaft 10 and circulating liquid in a closed toroidal path which includes a series of turbines, preferably three, and a reaction member or guide wheel. The first turbine $T_1$, represented by a single blade 21, the second turbine $T_2$, represented by a single blade 22, which receives oil from the first turbine $T_1$, and a third turbine $T_3$, represented by a single blade 23, which receives oil from the turbine $T_2$ and returns oil to the pump I, constitute the power output elements of the torque converter, and these are the driving or input elements for the planetary gearing. The reaciton member R is represented by the single reaction blade 26.

The first turbine $T_1$ is connected by a central shaft 31 to a rear input sun gear 35 of the planetary gearing. The second turbine $T_2$ is connected through a hollow shaft 32 surrounding the shaft 31 to a front input ring gear 37 which can be controlled or held fast by a reverse torque-establishing device 38. The turbine $T_3$ is connected through a hollow shaft 33 also surrounding the central shaft 31 and a neutral clutch 33A to drive the front carrier 40 and the rear carrier 42 of the planetary gearing, which carriers are connected together and respectively support front planetary pinions 44 meshing with the front input ring gear 37 and rear planetary pinions 46 meshing with the rear input sun gear 35. The shaft 33 and the carriers 40 and 42 form the principal drive shaft of the transmission and are connected to the transmission output shaft 16. A forward drive reaction ring gear 58 meshing with planets 46 completes the rear planetary unit of the reduction gear, and a reaction sun gear 60 meshing with the front planetary pinions 40 completes the front planetary unit.

The rear reaction gear 58 may be held fast to establish drive from the first turbine $T_1$ through the planetary reduction gear 35—46—58. To this end the reaction gear 58 is connected to the hub or inner race 62 of an inner one-way clutch or ratchet device having any suitable one-way or ratchet members mounted inside of an intermediate hub 66 which forms the outer race of the inner clutch. This is symbolically represented by the inner clutch. This is symbolically represented by the blade 64 fixed to the inner race 62 and overlapping the outer race 66, which indicates that the race 62 can turn forward toward the eye of the observer and away from the race 66 but cannot turn in the opposite direction. This is a symbolic representation of any suitable one-way clutch. The intermediate hub 66 forms the inner race for an outer one-way clutch represented by the blade 68 fixed to the intermediate race 66 and overlapping an outer race 70 which can be held against rotation by a torque-establishing device in the form of a reaction brake 72 which provides forward drive whenever the neutral clutch 33A is engaged. The intermediate race 66 is connected to the front reaction sun gear 60 and may be formed integral with it. The arrangement of the one-way clutches is such that when the torque-establishing device 72 is set, the hub 66 and the reaction sun gear 60 are prevented from turning backward and the hub 66, in turn, prevents the inner race 62 and the reaction gear 58 from turning backward. In one condition of operation the ring gear 58 turns forward while the reaction sun gear is held stationary, and under another condition, both the ring gear and the sun gear rotate forward. In reverse drive sun gear 60 is positively driven backward by the ring gear 58 through the one-way clutch 62—64—66, forward brake 72 being released.

The term torque-establishing device is used generically to mean any device which can be engaged to prevent relative rotation of two members which are otherwise relatively rotatable clutches and reaction brakes are examples. This nomenclature is used to avoid the confusion sometimes encountered in the definitions of brakes and clutches and is particularly important in this case because a particular device is sometimes a drive clutch and at other times is a reaction brake shown in FIG. 2 and as more fully disclosed in our divisional Patent 2,932,989, the disclosure of which is incorporated herein by reference.

For reverse drive, the neutral clutch 33A is engaged, the forward brake 72 is released, and the reverse brake 38 is set to hold the front ring gear 37 as a reaction gear, as shown in FIG. 2.

The stator is mounted on any suitable support, which will be described, having any known one-way brake represented by the blade 88 and supported on a stationary tube 90 so as to permit forward rotation but prevent backward rotation in the well-known manner. In order to provide different ranges of torque multiplication for different driving conditions, the angular positions of the blades 26 of the reaction member may be changed. For this purpose, each reaction blade 26 is fixed to a rotatable shaft 84 having a crank arm 86. Suitable operators, described below, position the cranks to hold the blades at the desired angles.

If it is desired to drive the car at a low speed ratio indefinitely, the rear reaction gear 58 is positively held by a brake 74 and all other friction couplings are released, as shown in FIG. 2. In these conditions the first turbine $T_1$ drives the rear input sun gear 35 which, because the ring gear 58 is held, drives the carrier 42 and output shaft 16 forward at a speed which bears a constant ratio to the speed of the turbine $T_1$, this ratio being determined by the rear planetary gear set. The turbine $T_1$ cannot become disengaged from the drive because the reaction gear 58 is prevented from free wheeling. $T_2$ cannot have any effect on the drive because, altho it drives ring gear 37, there is nothing to hold the reaction gear 60, brake 72 having been released. Consequently, under these conditions the car remains driven solely by $T_1$ at a definite speed ratio with respect to $T_1$.

This arrangement is also useful to retard the car going down grades. Consequently, the operator for this condition is labeled hill retard in FIG. 3. Brake 74 is set and all other friction devices are released. $T_2$ and $T_3$ are effectively disconnected from the output shaft 16, as explained above, and the output shaft drives the carrier 42 whenever the car tends to drive the engine. This overdrives the turbine $T_1$; that is, it drives the turbine $T_1$ faster than the output shaft by the ratio of the planetary gear set 35—46—58 and at this high speed, the turbine $T_1$ tends to become an impeller, transmitting torque to the impeller blades 20 which are held to a slower speed by the engine and so oppose movement of the car.

The transmission may have any suitable parking lock or brake such as a gear or circular flange secured to the carrier 42 or output shaft 16 and having peripheral teeth 76 which can be locked by a dog 78 secured to the frame.

The patent referred to illustrates one form of actual structure embodying the invention including the elements and their mode of operation disclosed schematically above.

The reaction member, guide wheel, or stator R which is placed between the outlet of turbine $T_3$ and the inlet of impeller I includes the previously mentioned adjustable blades or vanes 26, each fixed to a spindle 84. Each spindle 84 has a crank arm 86 disposed in an annular groove in a piston 222 sliding in an annular cylinder 224. The piston 222 divides the cylinder 224 into a pair of pressure chambers 242 and 244.

The hydraulic force of oil circulating through the stator tends to hold the blades 26 as nearly as possible parallel to the direction of oil flowing past them. This is because the blades have a larger area on the downstream side of the pivots than on the upstream side. This position is referred to as low angle, or low performance position and is the position in which the blades redirect the oil through the lowest angle from turbine $T_3$ to impeller I, and thus provides the lowest range of torque multiplication.

When there is no pressure in the chamber 244 the pressure of oil in the converter acting in chamber 242 (the converter being kept filled with oil under pressure as is customary) holds the piston to the left in the position shown in FIG. 3 and holds the blades 26 at high angle, in which they redirect the oil from $T_3$ to impeller I through the greatest angle to provide the greatest range of torque multiplication. The pressure maintained in the converter and the area of the piston are selected so that the force of oil on the right hand side of the piston in the high-angle holding chamber 242 is sufficient to overcome the hydraulic force tending to move the blades to low angle when the chamber 244 is vented. If the low-angle holding chamber 244 is filled, at or above converter pressure in the chamber 242 this balances or overcomes the force of static pressure on the right side of the piston, allowing the hydraulic force of circulating oil on the blades 26 to hold them at low angle or even positively moving the blades to low angle. When it is desired to place the blades at high angle, the passage 232 is vented as will be explained by the control apparatus so that the force of pressure in chamber 242 moves the blades to high angle.

Control system

The structure described can be operated by any suitable controls which select the desired torque-transmitting relationships, that is direction of drive and speed ratios and which place the stator blades in the desired positions either manually or automatically. One example of controls embodying the invention is shown diagrammatically in FIG. 3.

In general, this control system includes any suitable source of control fluid under pressure, a manually operable selector valve for selecting forward, neutral, and reverse and hill braking or low; an automatic valve for regulating the pressure of the control system in accordance with torque demand on the engine, and a manual valve for placing the stator in high angle after the throttle has been fully opened.

The source of pressure includes a front pump 108 of FIG. 3 driven by the engine and the rear pump 270 driven by the output shaft. The pumps take in oil from a sump 400 and deliver it at high pressure through the check valves 402 and 404, respectively, to a main line 406. The pressure in the main line is regulated by any suitable pressure regulator valve generally designated by 408 having an inlet port 410, a pressure regulating chamber 412, a converter feed port 414, a front pump selector port 416 and an exhaust port 418 which is connected to the sump. These ports are controlled by a valve stem generally designated 420 constantly urged to the right, as FIG. 3 is seen, by a spring 422. The arrangement is such that when neither pump is providing pressure, the spring holds the valve stem to the right, closing the converter feed port 414 and the exhaust port 418. Upon the building up of pressure to a sufficient value by either pump, the pressure in the regulating chamber 412 moves the stem to the left until the converter feed port 414 opens to supply oil to the converter at a predetermined pressure through the conduit 114. The discharge passage 190 from the converter leads eventually to the sump and pressure within the converter is controlled by a pressure responsive discharge valve 424 in the conduit 190. The conduit 190 includes a cooler 426 and a bypass valve 428 for the cooler which is both temperature and pressure responsive, and the particular construction of which will be explained in detail below.

The continuous supply of oil from the regulator valve converter feed port 414 and the continuous discharge of oil from the converter through the pressure release valve 424 maintains the converter filled or charged with oil under any desired pressure, for example, 30 pounds per square inch, as is known.

Whenever the pressure in the main line 406 reaches a predetermined value, which occurs when the rear pump is operating at sufficient capacity to supply the controls and lubrication of the entire system at the desired pressure the regulator valve stem 420 moves further to the left and the land 430 uncovers the exhaust port 418 so that the pump selector port 416 is opened to exhaust. This connects the front pump outlet directly to exhaust in front of the check valve 402 and so vents the front pump to reduce the power required to drive it. The rear pump now supplies the entire requirement of the system through the check valve 404 which is now opened, the check valve 402 being closed by the pressure of the rear pump to prevent leakage through the front pump. The pressure produced by the rear pump is regulated at a maximum value by a land 432 which uncovers the pump selector port 416 and so discharges any excess oil from the regulator valve inlet 410 through the port 416 around land 432 and to the exhaust port 418.

The main line 406 supplies oil at the regulated pressure as determined by chamber 412 in the known manner to a manual valve 440 which selectively directs oil under pressure to the pressure chambers for operating the various clutches and brakes previously referred to. The manual valve has four inlet ports connected to the gallery 442 supplied by the main line 406, four exhaust ports, each designated 444, and a valve stem 446 having the lands shown. The drawings show the valve stem in the position for forward drive so that oil is supplied to the chamber 156, which when pressurized engages neutral clutch 33A and to the chamber 318, which when pressurized sets the forward reaction brake 72 all other brake operating chambers being connected to an exhaust port. If the valve stem is moved one notch to the right into the hill retard or brake position, marked Hill Ret. in FIG. 3, oil will be supplied from the gallery 442 to the chamber 322 which when pressurized sets the hill brake 74, and all other chambers will be vented. On the other hand, if the valve stem is moved one notch to the left form the forward position, that is to neutral labeled N in FIG. 8, all clutch and brake chambers will be vented and the oil supply will be interrupted so that the transmission cannot drive. If the valve stem is moved one notch to the left from neutral, as indicated by the legend R, both the neutral clutch chamber 156 and the chamber 202 which sets the reverse reaction brake 38 will be supplied with oil and the other chambers will be vented. This will drive the car backward.

The control includes automatic means for timing the building up of pressure in the pressure chambers to provide smooth application of the clutches. To accomplish this, the oil flowing from the main line 406 to the manual valve 440 must pass through a timing valve 450 which first permits the oil to flow quickly through an unrestricted orifice 452 and then requires the oil to flow slowly through a restricted orifice 458. The orifices are in a piston valve 460 urged to the left by a spring 462 so that the large orifice is normally connected in the line 406. Whenever forward drive or reverse drive is established, the manual valve supplies oil to the neutral clutch chamber 156, and oil flows rapidly to fill the neutral clutch chamber 156 and either the forward clutch chamber 318 or the reverse clutch chamber 202, filling these two chambers, taking up any slack or lost motion in the clutches and engaging the friction surfaces lightly. At this point the clutches are not engaged with sufficient force to sustain the torque required to establish drive. As soon as the chambers and their connecting lines are filled, the increase of pressure in the line 406 moves the piston valve 460 to the right against the spring 462 and closes the large orifice 452 requiring the oil to flow slowly through the restricted orifice 458. While the pressure in the aforesaid chambers is building up to its final value, oil is being supplied by a line 464 to an accumulator generally designated by 466 in which the oil moves an accumulator piston valve 470 to the left against a spring 472. The increase in volume of the cylinder effected by movement of the piston 470 helps to delay the buildup of pressure to its final value in the clutch chambers to give a smooth gradual engagement of the clutches. By the time the pressure has built up to the value of pressure maintained normally by the regulator valve 408, the piston valve 470 has opened a conduit 478 leading to a pressure chamber 480 at the right of the piston valve 460 in the timing valve 450. This balances the pressure on opposite sides of the piston 460 so that the spring 462 moves the piston valve again to the left, connecting the large orifice 452 in the main supply line 406 so that the timing valve will be conditioned for the next clutch application, and pressure in the friction elements will be maintained at the desired value due to rapid possible flow through the orifice 452 in spite of any leakage in the manual valve or passages controlled by it.

The value of the pressure maintained by the regulator valve 408 may be changed as desired for different operating conditions of the transmission. For example, suppose the regulating valve as so far described is designed to maintain a predetermined pressure for holding the hill brake actuated by the chamber 322. A lower pressure than this will hold the neutral clutch and the forward and reverse clutches. Therefore, whenever the neutral clutch is applied, which will be either in normal forward or reverse drive, the pressure in the main line 406 is reduced by a pressure chamber 482 acting on land 484 of the regulator valve in which chamber main line pressure is maintained by a conduit 486 leading from the neutral clutch chamber 156. Pressure in the chamber 482 opposes the force of the spring 422 and thus reduces the pressure which will be maintained by the valve 408, as is known.

In addition, the line pressure at any setting of the transmission can be regulated in accordance with torque demand on the engine by a modulating control chamber 492 at the left end of the regulator valve which assists spring 422 by being connected through conduit 494 to a pressure modulating valve, generally designated by 496, which maintains in the line 494 a pressure measured by the torque demand on the engine. When the torque demand is high, the pressure in the main line 406 is high, while when torque demand is low, line pressure is reduced.

The modulator valve 496 may be of any suitable known construction. For example, a valve stem 500 either admits oil under main line pressure from main line 406 to a modulated pressure chamber 501 or vents chamber 501 through an exhaust port 502. The valve stem is urged down or toward open position to increase the pressure in line 494 by a spring 503 and is urged up or toward closed and vented position to reduce pressure in the line 494 by the force of the modulated pressure conducted from chamber 501 to a modulating chamber 504. The spring is opposed by a diaphragm 505 exposed on one side to atmospheric pressure and on the other side to the pressure of the intake manifold of the engine of the car connected to the closed chamber 506, one side of which is formed by the diaphragm 505. This is one known form of device for maintaining in the modulated pressure chamber 501 and in the modulating chamber 492 of the main pressure regulating valve, a pressure measured by the torque demand on the engine.

It may be desirable to have line pressure increase quickly when engine torque is about to increase, and to have it decrease slowly when engine torque is about to drop. To this end, the modulating conduit 494 which changes the pressure maintained by the regulator valve 482 is connected to an accumulator generally designated 508 through a check valve 510 having a small orifice 512 and normally closed by a spring 514. If the throttle is opened suddenly, indicating that the torque is to be increased, the pressure in the line 494 tends to increase and because the check valve 510 is closed, pressure builds up quickly in chamber 492. Thereafter oil flows slowly through the orifice 510, filing a cylinder 515 by displacing a piston 516 against a spring 517. On the other hand, if the throttle is suddenly closed, indicating that the torque of the engine is about to decrease it is desired to have the pressure in the system remain at a high value for a short period to enable the clutches to hold tight until the engine slows down and the torque is actually reduced. When this occurs the valve stem 500 may suddenly open the exhaust port 502 but oil in the accumulator cylinder 515 will then flow out rapidly through the check valve 510 opened by the pressure of the cylinder as determined by the spring and this will delay reduction of pressure in the line 494.

*Control of torque multiplication*

The range of torque multiplication effected by the torque converter is controlled by positioning the blades 26 of the reaction element, as shown in FIG. 3. The blades are urged to a high angle against the hydraulic force of the blades by pressure of oil in the high angle holding chamber 242 whenever the low angle control chamber 244 is vented. The apparatus is designed so that the converter pressure which always exists in high-angle holding chamber 242 can always overcome the hydraulic force on the blades which urges them to low angle whenever the low-angle holding chamber 244 is vented.

It is desirable to have the blades 26 normally in low angle and to place them in high angle ony in times of very high torque demand which can be indicated by the throttle being wide open. Therefore, the low-angle holding chamber 244 is normally filled with oil at converter pressure. This is done by connecting conduit 232 to converter supply conduit 114 through a normally open kick-down valve generally designated by 520.

This includes a valve stem 522 urged to the left, as FIG. 3 is seen, by spring 524 so that the groove 526 connects the conduit 232 through a restricted orifice 528 to the converter charging line 114. This balances the pressures on the piston 222 so that the hydraulic force on the blades 26 holds them in low angle. The valve stem 522 may be moved to the right, into the position shown in FIG. 3 by an operating arm 530 connected to the usual throttle pedal, not shown and which, after the throttle has been fully opened, moves the valve stem 522 to the position shown in FIG. 3 in which the connection of the orifice 528 to the kick-down valve is closed by a land 532 and the line 232 is connected through groove 526 to a vent line 534. In order to prevent the stator being placed in high-performance position when the transmission is in some particular torque-transmitting relationship for example reverse, the vent line 534 is connected to the port of the manual valve 440 which fills the chamber which establishes that relationship, for example reverse 202. Therefore, when the transmission is in reverse, if the throttle pedal is floored, line pressure is supplied through line 534 and kickdown valve 520 to the low-angle control chamber 244 of the stator. Only when the transmission is not in reverse can the chamber 244 be vented to place the stator in high angle.

The converter discharge passage 190 passes either through the cooler 426 or through the temperature and pressure-responsive by-pass valve 428, then through the pressure-responsive release valve 424 which maintains the desired pressure in the converter, and finally through lubrication passages marked "Lube" in FIG. 3 to the sump 400.

If the oil is below a predetermined temperature the by-pass valve 428 is open and oil does not flow through the cooler. However, if the oil is above this predetermined temperature the valve 428 is closed to direct oil through the cooler 426 from which oil then flows to the release valve 424.

The conduit 190 includes a passage 550 in the body of the valve 428 by which the temperature of the oil can be communicated to the valve mechanisms. The mechanism proper includes a closed cylinder 556 urged by a heavy spring 558 against a fixed diaphragm 560 secured to the casing of the valve 428. The cylinder 556 is filled with a thermo-responsive wax 562 which expands when heated and the cylinder contains a small rod 564 which protrudes through the diaphragm 560 and is secured to a valve 556 which can be closed on a seat 568 but is urged away from the seat by a light spring 570. Whenever the wax is cold the spring 570 urges the valve 566 away from its seat and pushes the rod 564 into the cylinder 556. Whenever the wax is warm it expands and pushes the rod 564 out of the cylinder and so moves the valve 566 against the seat 568 against the force of the spring 570. Whenever the wax is hot and the valve 566 closed to divert oil through the cooler, should resistance to flow through cooler increase above a predetermined amount the entire valve is pushed off its seat by pressure of the oil in the conduit 550 against the force of the spring 558. The spring 558 exerts a greater force than the spring 570 so that when the wax is hot the spring 558 overcomes the spring 570 and holds the valve 566 on its seat.

This constitutes both a temperature-responsive and pressure-responsive relief valve which by passes the cooler either in the event that the temperature of the oil is below a predetermined amount or the resistance to flow through the cooler is above the predetermined amount.

We claim:

1. A power transmission comprising in combination, a device which transmits torque hydrodynamically from an impeller to a turbine, which turbine transmits torque to an output shaft selectively in a plurality of torque transmitting relationships, adjusting means including adjustable hydrodynamic blades which varies the torque transmitted from the impeller to the turbine, means urging the adjusting means toward a first position providing one range of varying torque ratios between the impeller and turbine, means including a first fluid pressure chamber for overcoming the urging means and holding the adjusting means in a second position providing a different range of varying torque ratios between the impeller and turbine, a source of fluid under pressure, means for selectively establishing the various torque transmitting relationships between the turbine means and output shaft including a second fluid pressure chamber for establishing one of its relationships, means for supplying fluid under pressure to said second chamber to establish said one of said relationships, means for interrupting the supply and venting said second chamber to prevent the establishment of said one relationship, and means for selectively connecting the first chamber to the source or to the second chamber.

2. A power transmission comprising in combination a device which transmits torque hydrodynamically from an impeller to a turbine which turbine is adapted to drive an output shaft selectively forward or backward, movable adjusting means including adjustable hydrodynamic blades which varies torque transmitted from the impeller to the turbine, means urging the adjusting means toward a first position providing one range of torque ratios between the impeller and turbine, a first fluid pressure chamber for overcoming the urging means and holding the adjusting means in a second position providing a different range of torque ratios between the impeller and turbine, a source of fluid under pressure, means for selectively establishing forward or reverse drive between the turbine and output shaft including a reverse fluid pressure chamber for establishing reverse drive, means for supplying fluid under pressure to the reverse chamber to establish reverse drive, means for interrupting the supply and venting the reverse chamber to prevent the establishment of reverse drive, and means for selectively connecting the first chamber to the source or to the reverse chamber.

3. A power transmission comprising in combination, a device which transmits torque hydrodynamically from an impeller to a turbine, which turbine transmits torque to an output shaft selectively in a plurality of torque transmitting relationships, movable adjusting means including adjustable hydrodynamic blades adapted to establish different ranges of torque ratios transmitted from the impeller to the turbine, means urging the adjusting means toward a first position providing a high range of torque ratios between the impeller and turbine means, a first fluid pressure chamber for overcoming the urging means and holding the adjusting element in a second position providing a low range of torque ratios between the impeller and turbine means, a source of fluid under pressure, means for selectively establishing the torque transmitting relationships between the turbine means and output shaft including a second fluid pressure chamber for establishing one of the relationships, means for supplying fluid under pressure to the second chamber to establish one of said relationships, means for interrupting the supply and venting the second chamber to prevent the establishment of said one relationship, and means for selectively connecting the first chamber to the source or to the second chamber.

4. A power transmission comprising in combination, a device which transmits torque hydrodynamically from an impeller to a turbine, which turbine means is adapted to drive an output shaft selectively forward or backward, movable adjusting means including adjustable hydrodynamic blades adapted to establish different ranges of torque ratios transmitted from the impeller means to the turbine means, means urging the adjusting means toward a first position providing a high range of torque ratios between the impeller and turbine, a first fluid pressure chamber for overcoming the urging means and holding the adjusting element in a second position providing a low range or torque ratios between the impeller and turbine means, a source of fluid under pressure, means for selectively establishing forward or reverse drive between the turbine means and output shaft including a second fluid pressure chamber for establishing reverse drive and a third fluid pressure chamber for establishing forward drive, means for supplying fluid under pressure to the third chamber while venting the second to establish forward drive, means for supplying fluid under pressure to the second chamber while venting the third chamber to establish reverse drive and means for selectively connecting the first chamber to the source or to the second chamber.

5. A power transmission comprising in combination, a device which transmits torque hydrodynamically from an impeller to a turbine, which turbine is adapted to transmit torque to an output shaft selectively in a plurality of torque transmitting relationships, movable adjusting means including adjustable hydrodynamic blades which varies the torque transmitted from the impeller to the turbine, first fluid pressure means for urging the adjusting means toward a first position providing one range of varying torque ratios between the impeller and turbine, a second fluid pressure means for overcoming the urging means and holding the adjusting means in a second position providing a different range of varying torque ratios between the impeller and turbine, means normally connecting the first and second fluid pressure means, a source of fluid under pressure, means for selectively establishing the torque transmitting relationships between the turbine and output shaft including a third fluid pressure chamber for establishing one of the relationships, means for supplying fluid under pressure to said third chamber to establish said one of the relationships, means for interrupting the supply and venting the third chamber to prevent the establishment of said one relationship, and means for interrupting the connection between the first and second fluid pressure means and for connecting the second fluid pressure means to said third chamber.

6. A power transmission comprising in combination, a device which transmits torque hydrodynamically from an impeller adapted to be driven by an engine to a turbine, which turbine is adapted to transmit torque to an output shaft selectively in a plurality of torque transmitting relationships, movable adjusting means including adjustable hydrodynamic blades which varies the torque transmitted from the impeller to the turbine, first fluid pressure means for urging the adjusting means toward a first position providing one range of varying torque ratios between the impeller and turbine, a second fluid pressure means for overcoming the urging means and holding the adjusting means in a second position providing a different range of varying torque ratios between the impeller and turbine means, means normally connecting the first and second fluid pressure means, a source of fluid under pressure, means for selectively establishing the torque transmitting relationships between the turbine means and output shaft including a fluid pressure chamber for establishing one of the relationships, means for supplying fluid under pressure to said chamber to establish said one of the relationships, means for interrupting the supply and venting the chamber to prevent the establishment of said one relationship, and means responsive to the torque demand on the engine for interrupting the connection between the first and second fluid pressure means and for connecting the second fluid pressure means to said chamber.

7. A power transmission comprising in combination, a device which transmits torque hydrodynamically from an impeller to a turbine, which turbine is adapted to transmit torque to an output shaft selectively in a plurality of torque transmitting relationships, movable adjusting means including hydrodynamic blades which varies the torque transmitted from the impeller to the turbine, first fluid pressure means for urging the adjusting means toward a first position providing one range of varying torque ratios between the impeller and turbine means, a second fluid pressure means for overcoming the urging means and holding the adjusting means in a second position providing a different range of varying torque ratios between the impeller and turbine means, means normally connecting the first and second fluid pressure means, a source of fluid under pressure, means for selectively establishing the torque transmitting relationships between the turbine means and output shaft including a fluid pressure chamber for establishing one of the relationships, means for supplying fluid under pressure to said chamber to establish said one of the relationships, means for interrupting the supply and venting the chamber to prevent the establishment of said one relationship, and a manually operable kickdown valve for interrupting the connection between the first and second fluid pressure means and for connecting the second fluid pressure means to said chamber.

References Cited in the file of this patent

UNITED STATES PATENTS

| | | |
|---|---|---|
| 2,327,647 | Jandasek | Aug. 24, 1943 |
| 2,354,596 | Jandasek | July 25, 1944 |
| 2,387,398 | Hruska et al. | Oct. 23, 1945 |
| 2,548,207 | Dunn | Apr. 10, 1951 |
| 2,597,245 | Kelbel | May 20, 1952 |
| 2,627,723 | Seybold | Feb. 10, 1953 |
| 2,699,236 | Black | Jan. 11, 1955 |
| 2,707,887 | Slack | May 10, 1955 |
| 2,747,431 | Roche | May 29, 1956 |
| 2,791,913 | Slack | May 14, 1957 |

UNITED STATES PATENT OFFICE
CERTIFICATE OF CORRECTION

Patent No. 3,019,668                         February 6, 1962

Frank J. Winchell et al.

It is hereby certified that error appears in the above numbered patent requiring correction and that the said Letters Patent should read as corrected below.

Column 1, line 61, for "reaciton" read -- reaction --; column 2, line 47, for "rotatable clutches" read -- rotatable. Clutches --; column 5, line 15, for "form" read -- from --; line 16, for "FIG. 8" read -- FIG. 3 --; column 6, line 72, for "control" read -- holding --; column 7, line 5, for "ony" read -- only --; line 59, for "556" read -- 566 --; column 8, line 10, before "adjusting" insert -- movable --; line 23, for "its" read -- the --; column 9, line 13, for "or" read -- of --.

Signed and sealed this 10th day of July 1962.

(SEAL)
Attest:

ERNEST W. SWIDER
Attesting Officer

DAVID L. LADD
Commissioner of Patents